(12) United States Patent
Edwards et al.

(10) Patent No.: US 10,154,046 B2
(45) Date of Patent: Dec. 11, 2018

(54) SYSTEM AND METHOD FOR EVALUATION AND RESPONSE TO CYBER SECURITY EXPOSURE IN AN EMBEDDED CONTROL DEVICE

(71) Applicant: SCHNEIDER ELECTRIC USA, INC., Schaumburg, IL (US)

(72) Inventors: Benjamin W. Edwards, Rolesville, NC (US); Konstantin Alexander Filippenko, Grenoble (FR); Richard Karl Weiler, Wake Forest, NC (US); Matthew L. White, Raleigh, NC (US); Kevin M. Jefferies, Raleigh, NC (US)

(73) Assignee: Schneider Electric USA, Inc., Andover, MA (US)

(*) Notice: Subject to any disclaimer, the term of this patent is extended or adjusted under 35 U.S.C. 154(b) by 87 days.

(21) Appl. No.: 14/980,527

(22) Filed: Dec. 28, 2015

(65) Prior Publication Data
US 2017/0187728 A1      Jun. 29, 2017

(51) Int. Cl.
H04L 29/06     (2006.01)
H04L 12/26     (2006.01)

(52) U.S. Cl.
CPC ...... *H04L 63/1408* (2013.01); *H04L 43/0811* (2013.01); *H04L 63/1433* (2013.01); *H04L 63/308* (2013.01)

(58) Field of Classification Search
CPC . H04L 63/14; H04L 63/1408; H04L 63/1416; H04L 63/1425; H04L 63/1433; H04L 63/1441; H04L 63/308; H04L 43/0811
See application file for complete search history.

(56) References Cited

U.S. PATENT DOCUMENTS

| | | | |
|---|---|---|---|
| 7,770,225 B2 | 8/2010 | Hammond | |
| 2005/0015624 A1 | 1/2005 | Ginter et al. | |
| 2011/0060427 A1* | 3/2011 | Batke | G05B 23/0267 |
| | | | 700/79 |
| 2011/0173699 A1 | 7/2011 | Figlin et al. | |
| 2013/0104236 A1 | 4/2013 | Ray et al. | |
| 2014/0090071 A1 | 3/2014 | Salehie et al. | |
| 2014/0373161 A1 | 12/2014 | Hudson et al. | |
| 2015/0304352 A1* | 10/2015 | Machado | G06F 21/577 |
| | | | 726/22 |

OTHER PUBLICATIONS

Extended European Search Report for EP Application No. 16203375.7, dated Feb. 17, 2017, 7 pages.
EP Examination Report of European Patent Application No. 16203375.7 dated Apr. 6, 2018, 6 pages.

* cited by examiner

*Primary Examiner* — Ayoub Alata
(74) *Attorney, Agent, or Firm* — Locke Lord LLP

(57) ABSTRACT

A system and method for evaluating and altering, if necessary, the potential for a cyber security attack on an individual embedded device located on a local network assumed to be protected from outside cyber threats. In a first level of potential exposure the system attempts to send an outgoing message to a known IP address on a network outside the local network. If the outgoing messages are confirmed as received the embedded device has access to outside networks. In a second level of potential exposure the known outside IP address attempts to send an incoming message to the embedded device. If the incoming message is received the embedded can be accessed from an external network.

16 Claims, 3 Drawing Sheets

SYSTEM AND METHOD FOR EVALUATION AND RESPONSE TO CYBER SECURITY EXPOSURE IN AN EMBEDDED CONTROL DEVICE

FIELD OF THE INVENTION

The present disclosure is related to embedded industrial control devices on local control networks and particularly to a method and apparatus for determining the potential for a cyber security attack on an individual embedded industrial control device.

BACKGROUND OF THE INVENTION

The industrial control products industry has historically stipulated or assumed that embedded control devices and/or industrial control products, which are part of an industrial control system or an industrial automation system, are connected to private networks. For example, being connected only to local control networks or in-plant networks, not to the internet or any global networks outside of the local control network. Stating or specifying that embedded control devices or products should be used in a 'safe' network environment has been an industry standard. However, this assumption or instruction has not always been followed, leading to embedded control products often having connections to the internet, either accidentally or on purpose. Embedded control products can be exposed to cyber security threats at different levels of severity depending on their function in the network and how they are connected to the internet (outside world). They can be connected directly to the internet, or indirectly through a firewall or network address translation (NAT), which is expected to provide cyber security protection.

In the past embedded industrial control devices have been compromised, some events, such as the 2014 attack on a German steel mill, which significantly damaged a blast furnace, have achieved significant notoriety. With the recent increases in cyber attacks on many networks that were thought to be secure our awareness of the vulnerability of industrial control networks, and the potential for personal injury, death, equipment damage or loss of production that could result, has also increased. Therefore, there is a need to decrease the exposure to, and risk from, cyber security threats on industrial control devices with possible connections to the internet or an outside global network. Thus, a need for more robust, automatic cyber security protection within each embedded control product would be most desirable.

SUMMARY OF THE INVENTION

The present invention provides a system for evaluating a potential for cyber security exposure of an embedded control device, the system comprising:
an embedded device having at least one communications port capable of sending outgoing messages and receiving incoming messages on a local network;
a memory for storing an algorithm defining steps for evaluating the potential cyber security exposure of the embedded device;
a processor capable of performing the stored steps for evaluating the potential cyber security exposure of the embedded device; and
wherein evaluating the potential cyber security exposure of the embedded device comprises; determining a cyber security threshold for the embedded device;
initiating, by the processor, a first level of potential cyber security exposure evaluation by sending an outgoing message from the at least one communications port to an IP address known to be accessible on a network outside the local network, the message initiating a second level of cyber security exposure evaluation by requesting an incoming response message from the receiving IP address;
comparing, by the processor, a success/failure status of the outgoing and incoming messages with the cyber security threshold; and
maintaining or altering a current level of cyber security exposure, by the processor, based on the comparison.

The present invention also provides a method for evaluating a potential cyber security exposure of an embedded control device located on a local control network, the method comprising:
determining a cyber security threshold for the embedded device;
sending, from a communications port of the embedded device, an outgoing message to an IP address known to be accessible on a network outside the local network, the message requesting an incoming response message from the receiving IP address indicating receipt of the outgoing message;
comparing, by a processor of the embedded device, a success/failure status of the outgoing and incoming messages with the cyber security threshold for the industrial control device; and
maintaining or altering a current level of cyber security exposure, by the processor based on the comparison.

Although the invention as disclosed herein is applied to any embedded control device, which comprises motor controllers, motor overload relays, programmable logic controllers (PLC), variable speed motor drives, programmable logic relays, sensors, etc., it can also be applied to other devices residing on a local network that have a memory for storing the algorithm steps and a processor capable of performing the stored steps.

DETAILED DESCRIPTION OF THE INVENTION

Figure 1:
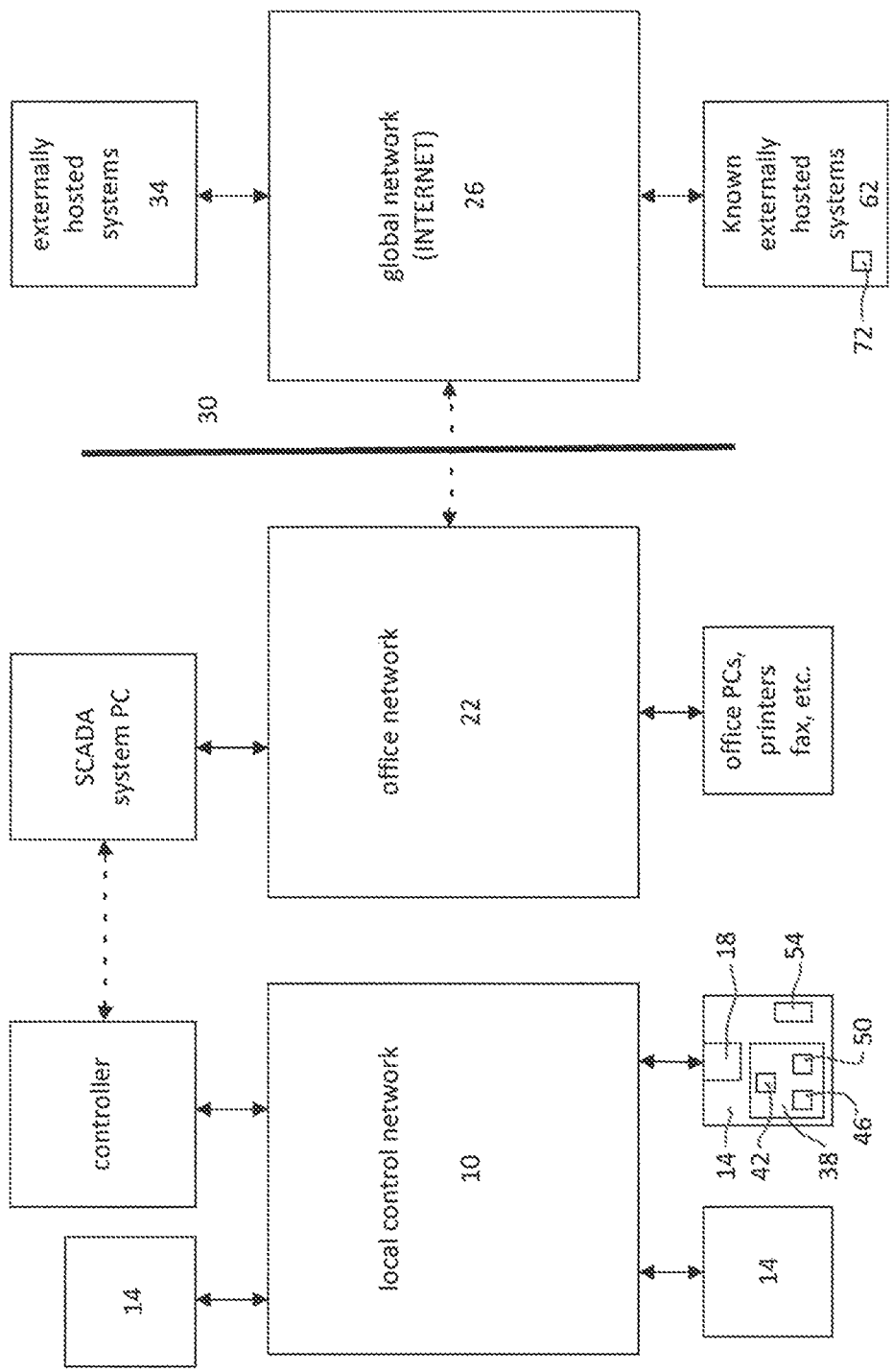
FIG. 1 illustrates a local area network with embedded industrial control devices and possible connections to the internet or other global network.

FIG. 1 illustrates a local industrial control network generally indicated by reference number 10. The local control network 10 can be hard wired or wireless. Operatively connected to the local control network 10 are a number of individual embedded control devices 14, which can comprise motor controllers, motor overload relays, programmable logic controllers (PLC), variable speed motor drives, programmable logic relays, sensors, etc. Each embedded control device 14 has at least one communications port 18 that provides two way communications between the embedded control devices 14 on the local control network 10. The local control network 10 can also have a connection to an office network 22, which can be connected to a global network 26 (internet), usually through a firewall or virtual private network (VPN) 30. The firewall 30 provides some degree of isolation between the office network 22 and the global network 26. The global network 26 provides communication for millions of externally hosted systems 34, any one of which could initiate a cyber attack on an unprotected embedded control device 14. Each embedded control device 14 includes a memory 38 for storing information including its current potential cyber security exposure level 42, its cyber security exposure threshold 46 and an algorithm 50 used by a processor 54 to perform the potential cyber security exposure evaluation.

Figure 2:
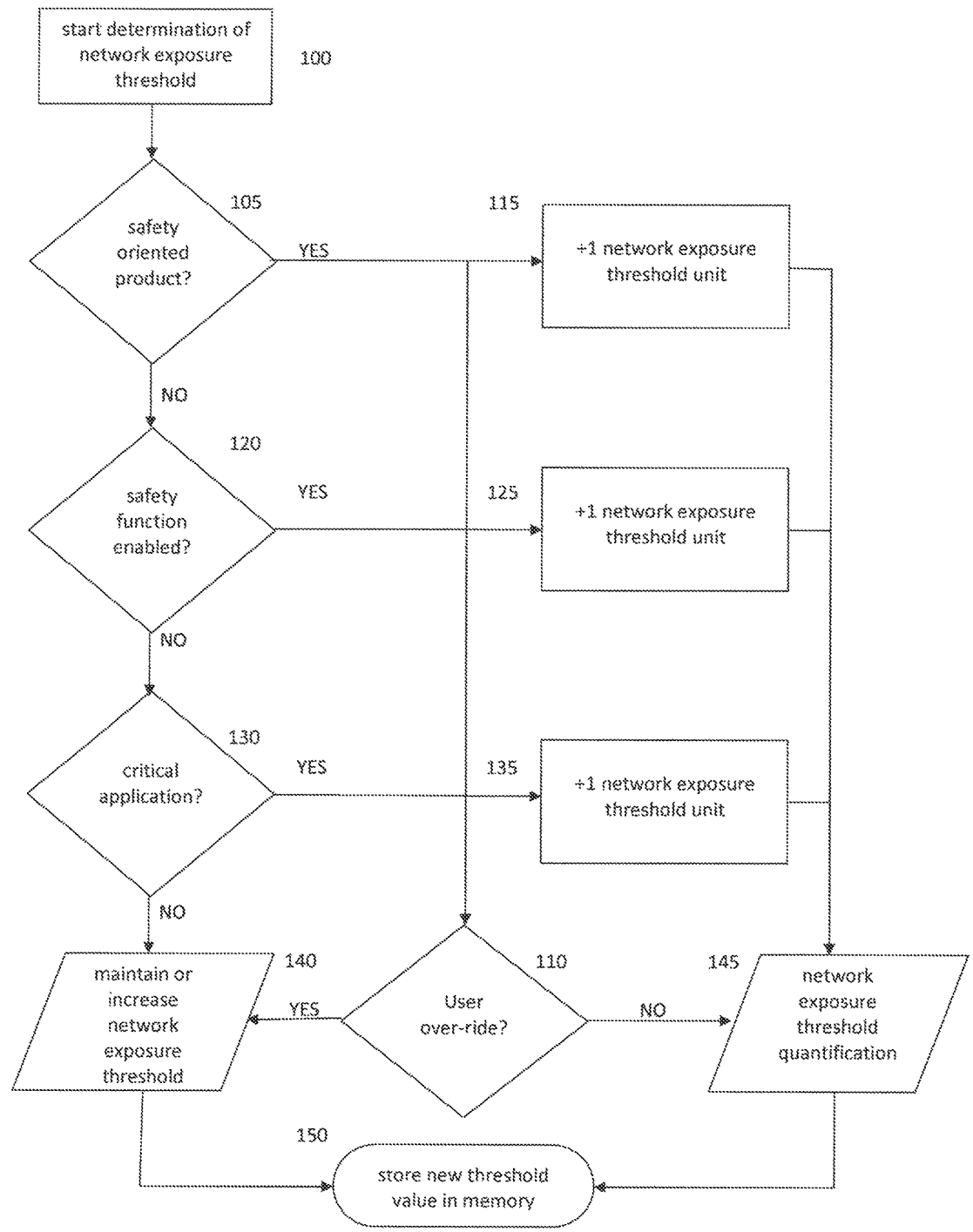
FIG. 2 is a flow chart for determining the exposure threshold of the embedded device.

FIG. 2 is a flow chart for determining cyber security exposure threshold 46 of the embedded control device 14. The cyber security exposure threshold 46 is directly related to the functional criticality of the embedded device 14. It is generally determined by a user during commissioning and is related to information about the functions of the embedded control device 14, such as the intended function of the embedded control device 14 with respect to design and regulatory standards concerned with its use, device configuration parameters such as which functions of the embedded control device 14 are enabled, and application parameters such as is the application of the embedded control device 14 critical with respect to safety of employees, equipment and/or processes. Other critical criteria can also be used to determine the cyber security threshold 46, but for the example in FIG. 3 only three criteria will be presented. The process for establishing the cyber security threshold 46 for an embedded device 14 starts at step 100 where all criteria being considered would have an initial threshold unit value of zero. At step 105, if the product was not considered safety oriented it would maintain a zero threshold unit. If it was considered a safety oriented product it would be given one threshold unit at step 115 unless the user had over-ridden the award at step 110. At step 120, if a safety function was not enabled the initial threshold unit of zero would be maintained. If a safety function was enabled one threshold unit would be awarded unless the user had over-ridden the award at step 110. At step 130, if the application was not considered critical initial threshold unit of zero would be maintained. If the application was considered critical one threshold unit would be awarded unless the user had over-ridden the award at step 110. At step 140 if all criteria maintained their initial zero threshold the current exposure threshold can be maintained or increased to a higher level but not exceeding the current level. At step 145 any awarded threshold units are quantified and a new threshold level determined. If the user has over-ridden any awarded threshold units they will not be counted. If the user has over-ridden all awarded threshold units the initial zero threshold units will be used and the result will be the same as step 140. At step 150 a new threshold value from either step 140 or 145 will be stored in memory. It is understood that the function of an embedded device 14 can change over time and thus the cyber security exposure threshold 46 and the potential for cyber security exposure can also change over time. It is also understood that the value of the threshold units can be weighted based on the criticality of the criteria being evaluated.

Figure 3:
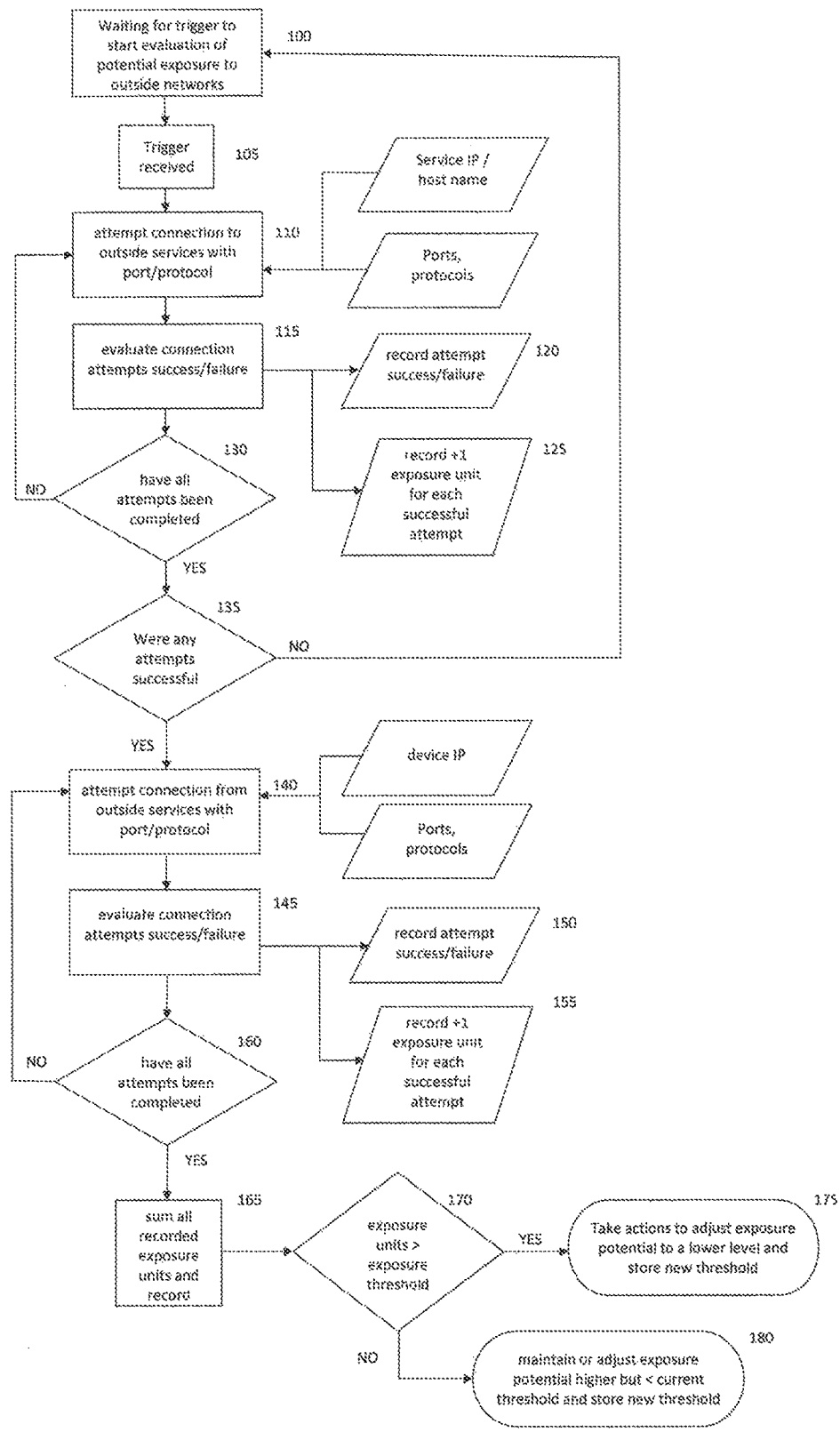
FIG. 3 is a flow chart for the overall evaluation of the potential cyber security exposure of an embedded control device and taking appropriate action to reduce exposure if required.

FIG. 3 is a flow chart for a method of the invention used to determine the potential cyber security exposure of an individual embedded control device 14, and adjust that level if required. At step 100 the system for determining the potential for cyber security process exposure is waiting for a trigger to initiate the evaluation process. The process can be initiated randomly, at a predetermined time or schedule, or by unusual traffic on the local control network 10. Once a trigger has been received at step 105, a first level of potential cyber security exposure of the embedded control device 14, is started at step 110. The first level of potential cyber security exposure is initiated directly by the processor 54, which selects one of the at least one communication ports 18, retrieves the cyber security exposure level evaluation algorithm 50 and other information required to perform the potential cyber security exposure evaluation from memory 38. The processor 54 attempts to send an outgoing message 58 from the selected port 18, using multiple available protocols, to a known externally hosted system 62, having an IP address stored in memory 38 and known to be accessible on the global network 26 outside the local control network 10. The known externally hosted system 62 can be provided by the manufacturer of the embedded control device 14 or a known third party service provider. The outgoing message 58 can include a request for delivery receipt notification, the embedded control device 14 identification, IP address, enabled or disabled services, port assignments, and a request that the known externally hosted system 62 send an incoming message to the selected port 18 of the embedded control device 14. At step 115 the connection attempt success (received) or failure (not received) of outgoing message 58 is evaluated. At step 120 the result of the success/failure attempt of the outgoing message 58 is recorded in memory 38. If the attempt was successful one exposure unit will be recorded for the attempt at step 125. To prevent recording a false "success" status a "success" status is only recorded when an expected response is included in an incoming message 66 received by the selected port 18 of the embedded control device 14. The expected response can be a predetermined authentication message that could be encrypted. The result of the first degree of potential cyber security exposure will indicate that the selected port 18 of the embedded control device 14 either has access to the global network 26 or does not have access to the global network 26 through the network it is connected to. At step 130, if all attempts have not been completed steps 110-125 are repeated for each remaining selected communications port 18 and protocol used by each selected communications port 18. If all attempts have been completed at step 130 and none were successful, the evaluation process will return to step 100. If at least one attempt was successful in the first level of potential cyber security exposure at step 135, the process will proceed to the second level of potential cyber security exposure.

The second level of potential cyber security exposure is indirectly initiated by the processor 54 through outgoing message 58. At step 140 the known externally hosted device 62, using information provided in the outgoing message 58, attempts to send an incoming messages 66 to the communications port 18, of the embedded control device 14 from which the outgoing message 58 was received, using any protocols identified in the outgoing message 58. At step 145 the connection attempt success or failure of incoming message 58 is evaluated. At step 150, the success/failure status of the incoming message 66, sent to the selected communications port 18 of the embedded control device 14 by the known externally hosted device 62, will be recorded in a memory 72 of the known externally hosted device 62 and the success status of those incoming messages 66 will be recorded in the memory 38 of the embedded control device 14. Since the embedded control device 14 cannot directly record the failed status of attempted incoming message 66 during the second level of potential cyber security exposure it must request the failed status from the known externally hosted device 62 in a subsequent message to the known externally hosted device 62 or it must assume a failed status after a pre-determined time duration. If the attempt was successful one exposure unit will be recorded for the attempt at step 155. The result of the second level of potential cyber security exposure will indicate that the selected communications port 18 of the embedded control device 14 either is exposed and can be accessed from the global network 26 or is not exposed and cannot be accessed from the global network 26. At step 160, if all attempts have not been completed steps 140-155 are repeated for each remaining communications port 18 and protocol used by each communications port 18 from which an outgoing message 58 was received by the known externally hosted device 62. If all attempts have been completed at step 160 the processor 58 will sum all recorded exposure units and record in memory 38 at step 165. At step 170 the processor 58 will compare the total exposure units with the exposure threshold. If the total threshold units exceed the threshold actions will be taken to adjust the exposure potential to a lower level at step 175. If the total threshold units does not exceed the threshold the current potential exposure level can be maintained or can be adjusted to a higher level but not exceeding the current level at step 180.

The success/failure status of the outgoing messages 58 and success status of incoming messages 66 can be given a numeric value (for example 1 for success and 0 for failure as used in the flow chart above), which is recorded in memory 38 for uses by the processor 54. The sum of the numeric values representing the outgoing 58 and incoming message 66 status is compared with the current cyber security exposure threshold 46 by processor 54 to determine if the current cyber security exposure threshold 46 has been exceeded. If the current cyber security exposure threshold 46 has not been exceeded the current potential cyber security exposure level can be maintained or can be adjusted to a higher potential cyber security exposure level, but not exceeding the current cyber security exposure threshold 46. If the current cyber security exposure threshold 46 has been exceeded the current potential cyber security exposure level can be adjusted to a lower potential cyber security exposure level by the processor 54.

The cyber security exposure threshold 46 establishes acceptance criteria to compare against the recorded received outgoing 58 and incoming 66 message for each communication port 18 and protocol combination that the embedded control device 14 and known externally hosted device 62 attempt. The acceptance criteria can be configurable by a user to accommodate specific application requirements; the criteria may also be updated with embedded control device 14 firmware or security updates supplied by the embedded control device 14 manufacturer to keep the criteria up to date with cyber security developments.

The embedded control device 14 takes action based on the result of the comparison between the results of the first and second levels of potential cyber security exposure and the cyber security exposure threshold 46. If the comparison shows that a specific network service of the embedded control device 14 creates a level of exposure above the cyber security exposure threshold 46 the action can be to modify or limit the characteristics of the service. This can include disabling the service, prohibit the changing of setting, permit monitoring only or requiring an increased level of authentication or security to access the service. For example, a webpage function can be disabled, or modified to require a username and password login, or to require a login using some form of security such as secure socket layer (SSL) or transport layer security (TLS). If the comparison shows that the level of exposure for the embedded control device 14 permits a lowered level of security for a function, the function may be restored to a user preferred, lower level of security, or the embedded control device 14 may prompt a user or administrator to allow the minimum threshold of security required to meet the results of the first and second levels of potential cyber security exposure. Adapting to the level of security required by the results of the first and second levels of potential cyber security exposure can be performed individually for each network service or function, or it can be performed for a subset of services and functions; this provides a potential benefit of increased usability or accessibility for the product.

Many services and functions of the embedded control device 14 can be controlled in this manner, to optimize the performance of the embedded device 14 within the constraints of the potential cyber security exposure level to the results of the first and second degrees of potential cyber security exposure. The following list includes some functions that can be managed by automatic cyber security exposure evaluation and response, though additional functions can be imagined:

Device firmware update

Account information modification, including username, password, credentials, contact information Access rights control, including the parameters that can be monitored or controlled Device function commands, such as reset, start, and stop of a motor, or output control of a logic controller Device configuration data, such as motor starter topologies, or parameterization such as external sensor types or ranges Service authentication requirements management—webpages, customer engineering tools, human machine interfaces Protocol management—Modbus/TCP, file transfer protocol (FTP), and secure FTP (SFTP), telnet, secure shell (SSH), hypertext transmission protocol (HTTP), HTTPS, etc.

To maintain validity of the management of services by cyber security autotuning, the embedded control device 14 can periodically execute the process for determining potential cyber security exposure described above. The period of automatic refresh can be fixed or random, and can be influenced by factors such as network traffic load, or the device profile and current potential cyber security exposure threshold. For example the period of automatic refresh may be lower if the cyber security exposure threshold 46 is lower, or the device application is identified by the user as critical.

In addition to a periodic refresh, various stimuli may prompt execution of the cyber security autotuning process. The following list includes some stimuli that can initiate execution of the cyber security autotuning process:

Changes to the device function, which change the network exposure threshold

Connections to the device from a new IP address, or from a new range of IP addresses Connections using previously unused protocols Failed authentication attempts Application of new security policies, such as a user initiated change or firmware update to the acceptance criteria for network exposure comparison Physical changes to the device, including adding or removing modules or extensions Updates to device settings, such as setting a new subnet mask, DHCP server, IP address assignment mechanism, etc Detection of device discovery service execution, for example a DPWS discovery

We claim:

1. A system for evaluating a potential cyber security exposure of an embedded control device, the system comprising:
    an embedded control device having a plurality of communication ports for sending outgoing messages and receiving incoming messages on a local control network;
    a memory for storing an algorithm defining steps for evaluating the potential cyber security exposure of the embedded control device and a determined cyber security threshold for the embedded control device, the threshold being based on a functional criticality of the embedded control device;
    a processor capable of performing the stored steps for evaluating the potential cyber security exposure of the embedded control device; and
    wherein evaluating the potential cyber security exposure of the embedded control device comprises:
    waiting for a trigger to initiate the potential cyber security exposure algorithm;
    receiving, by the processor, the trigger initiating the potential cyber security exposure algorithm;
    obtaining from the memory by the processor, the algorithm defining steps for evaluating the potential cyber security exposure of the embedded control device;
    initiating by the processor, a first level of potential cyber security exposure evaluation by selecting a communications port of the plurality of communication ports and a protocol from a plurality of protocols and sending an outgoing message from the selected communication port to an IP address of a plurality of IP addresses known to be accessible on a global network outside the local control network;
    recording one exposure unit when the outgoing message is successfully received by the IP address known to be accessible on the global network outside the local control network;
    repeating the selecting, sending and recording for all remaining of the plurality of communication ports, and the plurality of protocols;
    returning to waiting for a trigger if no successful outgoing message were received by the IP address known to be accessible on the global network outside the local control network;
    initiating, by the processor through another outgoing message, a second level of cyber security exposure evaluation by requesting an incoming response message from each of the plurality of IP addresses accessible on the global network successfully receiving the outgoing message;
    recording one exposure unit for each incoming response message successfully received by each of the plurality of communication ports;
    summing all recorded successful exposure units for the outgoing messages and incoming response messages;
    comparing, by the processor, the total recorded successful exposure units with the cyber security threshold; and
    maintaining or altering a current level of cyber security exposure, by the processor, based on the comparison.

2. The system of claim 1 wherein, the functional criticality of the embedded device comprises one or more of safety of employees, machine and processes, design and regulatory standards concerned with the embedded control device use and enabled functions of the embedded control device.

3. The system of claim 1 wherein, the determined cyber security threshold is determined by a user.

4. The system of claim 1 wherein, the trigger comprises one or more of a random timing, a predetermined schedule, or unusual traffic on the local control network.

5. The system of claim 1 wherein, the other outgoing message includes a request for delivery receipt notification or other indication that the other outgoing message was received by the IP address known to be accessible on a global network outside the local control network.

6. The system of claim 1 wherein, the requested incoming response message is a predetermined authentication message.

7. The system of claim 1 wherein, the current cyber security level is maintained if the total number of recorded successful exposure units is less than the cyber security threshold.

8. The system of claim 1 wherein, the processor is capable of disabling or modifying some functions of the embedded control device to reduce cyber security exposure of the embedded device if the total number of recorded successful exposure units is greater than the cyber security threshold.

9. A method for evaluating a potential cyber security exposure of an embedded control device located on a local control network, the method comprising:
    determining a cyber security threshold for the embedded control device, the threshold being based on a functional criticality of the embedded control device;
    waiting for a trigger to initiate a potential cyber security exposure algorithm;
    receiving, by a processor, the trigger initiating the potential cyber security exposure algorithm;
    obtaining from a memory by the processor, the algorithm defining steps for evaluating the potential cyber security exposure of the embedded control device;
    initiating by the processor, a first level of potential cyber security exposure evaluation by selecting a communications port of a plurality of communication ports and a protocol from a plurality of protocols and sending an outgoing message from the selected communication port to an IP address of a plurality of IP addresses known to be accessible on a global network outside the local control network;
    recording one exposure unit when the outgoing message is successfully received by the IP address known to be accessible on the global network outside the local control network;
    repeating the selecting, sending and recording for all remaining of the plurality of communication ports, and the plurality of protocols;
    returning to waiting for a trigger if no successful outgoing message were received by the IP address known to be accessible on the global network outside the local control network;
    initiating, by the processor through another outgoing message, a second level of cyber security exposure evaluation by requesting an incoming response message from each of the plurality of IP addresses accessible on the global network successfully receiving the outgoing message;
    recording one exposure unit for each incoming response message successfully received by each of the plurality of communication ports;

summing all recorded successful exposure units for the outgoing messages and incoming response messages;

comparing, by the processor, the total recorded successful exposure units with the cyber security threshold; and maintaining or altering a current level of cyber security exposure, by the processor, based on the comparison.

10. The method of claim 9 wherein, the functional criticality of the embedded device comprises one or more of safety of employees, machine and processes, design and regulatory standards concerned with the embedded control device use and enabled functions of the embedded control device.

11. The method of claim 9 wherein, the determined cyber security threshold is determined by a user.

12. The method of claim 9 wherein, the trigger comprises one or more of a random timing, a predetermined schedule, or unusual traffic on the local control network.

13. The method of claim 9 wherein, the outgoing message includes a request for delivery receipt notification or other indication that the other outgoing message was received by the IP address known to be accessible on a global network outside the local control network.

14. The method of claim 9 wherein, the requested incoming response message is a predetermined authentication message.

15. The method of claim 9 wherein, the current cyber security level is maintained if the total number of recorded successful exposure units is less than the cyber security threshold.

16. The method of claim 9 wherein, the processor is capable of disabling or modifying some functions of the embedded control device to reduce cyber security exposure of the embedded device if the total number of recorded successful exposure units is greater than the cyber security threshold.

* * * * *